US012725424B2

(12) United States Patent
Schiffer et al.

(10) Patent No.: US 12,725,424 B2
(45) Date of Patent: Sep. 1, 2026

(54) AI BASED MONITORING OF RACE TRACKS

(71) Applicant: Fujitsu Germany GmbH, Munich (DE)

(72) Inventors: Stefan Schiffer, Munich (DE); Marcel Naujeck, Munich (DE)

(73) Assignee: Fujitsu Germany GmbH, Munich (DE)

( * ) Notice: Subject to any disclaimer, the term of this patent is extended or adjusted under 35 U.S.C. 154(b) by 198 days.

(21) Appl. No.: 18/015,609

(22) PCT Filed: Jun. 27, 2022

(86) PCT No.: PCT/EP2022/067557
§ 371 (c)(1),
(2) Date: Jan. 11, 2023

(87) PCT Pub. No.: WO2023/274955
PCT Pub. Date: Jan. 5, 2023

(65) Prior Publication Data

US 2025/0131729 A1 Apr. 24, 2025

(30) Foreign Application Priority Data

Jul. 2, 2021 (EP) ..................................... 21183397
Nov. 4, 2021 (EP) ..................................... 21206396

(51) Int. Cl.
*G06V 20/54* (2022.01)
*G06T 7/00* (2017.01)
(Continued)

(52) U.S. Cl.
CPC ............ *G06V 20/54* (2022.01); *G06T 7/0002* (2013.01); *G06T 7/70* (2017.01); *G06V 10/25* (2022.01);
(Continued)

(58) Field of Classification Search
CPC ........ G06V 20/44; G06V 20/40; G06V 20/52; G06V 20/49; G06V 20/42; G06V 20/54;
(Continued)

(56) References Cited

U.S. PATENT DOCUMENTS 6,020,851 A 2/2000 Busack
2002/0054210 A1 5/2002 Glier et al.
(Continued)

FOREIGN PATENT DOCUMENTS

JP 2014232533 A 12/2014
JP 2019-124986 A 7/2019
(Continued)

OTHER PUBLICATIONS

Office Action dated May 7, 2025, from counterpart Japanese Patent Application No. 2024-118361.
(Continued)

*Primary Examiner* — Raphael Schwartz
(74) *Attorney, Agent, or Firm* — DLA Piper LLP (US)

(57) ABSTRACT

A novel, AI based monitoring system and method for race tracks such as race tracks used for professional and amateur car racing enables automatic detection of and reaction to critical situations along the race track, including a deviation of a vehicle from the race track and/or collision with a guide plank, a loss of oil, a person or other object on the race track or the like, rule based definition and association of the automatic detection and/or automatic reactions, tracking of vehicles along the race track, including storage of the driven track, automatic mapping of detected critical situations to one or more tracked vehicles involved in the critical situation, and/or automatic generation and cutting of video footage for a tracked vehicle.

20 Claims, 11 Drawing Sheets

(51) Int. Cl.

| | |
|---|---|
| ***G06T 7/70*** | (2017.01) |
| ***G06V 10/25*** | (2022.01) |
| ***G06V 10/26*** | (2022.01) |
| ***G06V 10/764*** | (2022.01) |
| ***G06V 10/774*** | (2022.01) |
| ***G06V 10/82*** | (2022.01) |
| ***G06V 20/62*** | (2022.01) |

(52) U.S. Cl.
CPC ............ *G06V 10/26* (2022.01); *G06V 10/764* (2022.01); *G06V 10/774* (2022.01); *G06V 10/82* (2022.01); *G06V 20/625* (2022.01); *G06T 2207/10016* (2013.01); *G06T 2207/30236* (2013.01); *G06T 2207/30241* (2013.01); *G06V 2201/08* (2022.01)

(58) Field of Classification Search
CPC ... G06T 7/20; G06T 2207/30241; G06T 7/70; G06T 17/00; G06T 2207/30232
See application file for complete search history.

(56) References Cited

U.S. PATENT DOCUMENTS

| | | | |
|---|---|---|---|
| 2014/0355835 | A1 | 12/2014 | Rodriguez-Serrano et al. |
| 2015/0371095 | A1* | 12/2015 | Hartmann ................. G06T 7/11 348/148 |
| 2018/0341812 | A1 | 11/2018 | Floor et al. |
| 2019/0205331 | A1 | 7/2019 | Chevahir |
| 2019/0222776 | A1 | 7/2019 | Carter et al. |
| 2021/0073539 | A1 | 3/2021 | Wu |
| 2021/0192214 | A1* | 6/2021 | Jiang ...................... G06N 3/045 |
| 2021/0370176 | A1 | 12/2021 | Xie et al. |
| 2024/0404291 | A1* | 12/2024 | Ward ...................... G01S 17/89 |

FOREIGN PATENT DOCUMENTS

| | | | |
|---|---|---|---|
| JP | 2021-511729 | A | 5/2021 |
| JP | 2022527157 | A | 5/2022 |
| WO | 2017/212232 | A1 | 12/2017 |
| WO | 2018134964 | A1 | 7/2018 |
| WO | 2018/180365 | A1 | 10/2018 |

OTHER PUBLICATIONS

Mon Nagala et al., “Optical Video Retreivel System Using Data Conversion Method with Autoencoder and its Application to Copyright Management”, Proceedings of the 47th Annual Meeting of the Institute of Image Electronics Engineers of Japan in 2019, Japan, General Incorporated Assocation—the Insititute of Image Electronics Engineers of Japan, Jun. 27, 2019, pp. 1-3.
Kosuke Imamura et al., “Search of Watermarked Image Using Compressed Feature from Auto Encoder,” Proceedings of the 2018 General Conference of the Institute of Electronics, Information and Communication Engineers—Information and Systems 2, Japan, General Incorporated Assocation—the Institute of Electronics, Information and Communication Engineers, Mar. 6, 2018, p. 15.
Yosuke Onitsuka et al., “Convolutional Feature Extraction for Kaou Image Retrieval”, Proceedings of Jinmoncom Symposium in 2018, Japan, Information Processing Society of Japan, Nov. 24, 2018, vol. 2018, pp. 257-262.
Yantao Shen et al., “Learning Deep Neutral Networks for Vehicle Re-ID with Visual-spatio-temporal Path Proposals,” 2017 IEEE International Conference on Computer Vision (ICCV), Oct. 22, 2017, pp. 1918-1927.
Decision to Grant mailed Feb. 10, 2026, from counterpart Japanese Application No. 2024-118361.
Auto motor und sport: “Digitalisierung der Nordschleife” w/translation, https://www.auto-motor-und-sport.de/motorsport/digitalisierung-nuerburgring-nordschleife/.
Nürburgring: “Premiere für digitale Infrastruktur der Nordschleife” w/translation, https://www.nuerburgring.de/news/premiere-fuer-digitale-Infrastruktur-der-nordschleife?locale=de.
Kelathodi Kumaran Santhosh et al., “Anomaly Detection in Road Traffic Using Visual Surveillance: A Survey,” arxiv.org, Cornell University Library, Olin Library Cornell University Ithaca, NY 14853, Jan. 24, 2019, XP081007617.
International Search Report dated Nov. 9, 2022 in counterpart International Application No. PCT/EP2022/067557.
Written Opinion dated Nov. 9, 2022 in counterpart International Application No. PCT/EP2022/067557.
Notice of Reasons for Refusal dated Jan. 9, 2024, of counterpart Japanese Patent Application No. 2023-503059, along with an English translation.
Extended European Search Report dated Jan. 2, 2025, from counterpart European Application No. 24 19 9783.2.

* cited by examiner

Single Frame
132
130
Single Frame → Car detected
134
Car
138
130
Single Frame → Car left screen
136
130

Road Segmentation
Grab State
140
Road + Car Segmentation
140
Road Segmentation
Grab State
140

150
150
Substract
Delta Image
144
142
Deep Learning
Classifier
Anomality detected
144

FIG 6A

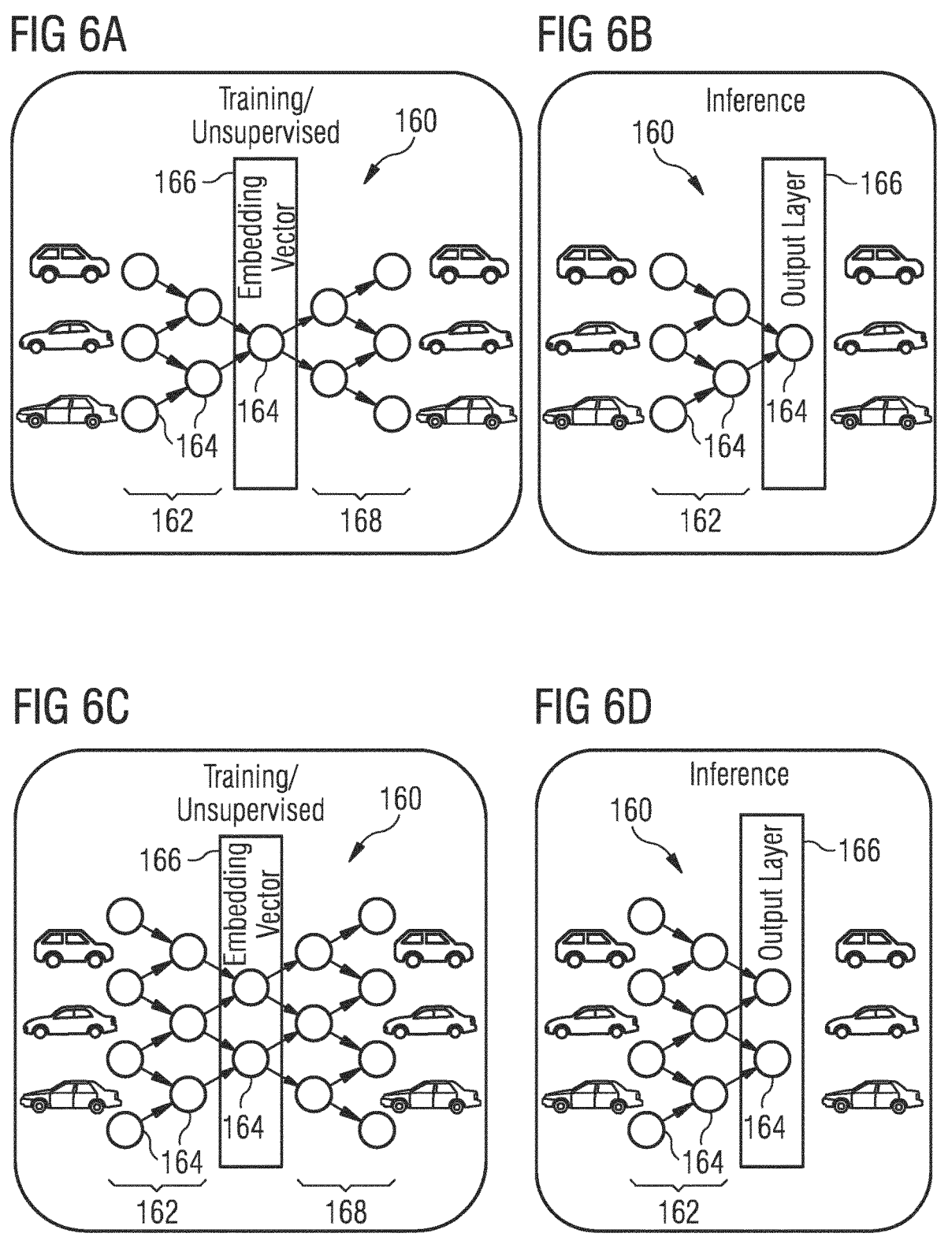

Training/
Unsupervised
160
166
Embedding Vector
164
164
162
168

FIG 6B

Inference
160
Output Layer
166
164
164
162

FIG 6C

Training/
Unsupervised
160
166
Embedding Vector
164
164
162
168

FIG 6D

Inference
160
Output Layer
166
164
164
162

180
182
184
188
Single Frame with car detection
GPS Koor.
Object 01
Object 02
190
Inferencing Unit
Processing GPS-Position interpolation, generating embedding vector.
Embedding Vector [0.56;0.34.0.78:...]
GPS Interpolation Lat121,34; Lon132,45
Obj 01
Obj 02
Requst ID from Digital Twin Server
Obj 01: Embedding Vector, Location CameraID
Obj 02: Embedding Vector, Location CameraID
Embedding Vector [0.56;0.34.0.78:...]
GPS Interpolation Lat123,34; Lon134,45

180
186
Internal representation
- Cars in Cam-Units near position
- Plausibility min Threshold <Location n-1
- Location n >Plausibility max Threshold
- Nearest Embeddingvector from Car in plausible Locations
Mapping:
Obj 01->CarID 11
Obj 02->CarID 34
GPS Interpolation Lat121,34;Lon132,45
CarID 11
Embedding Vector [0.56;0.34.0.78:...]
CarID 34
Embedding Vector [0.56;0.34.0.78:...]
GPS Interpolation Lat123,34; Lon134,45

180
184
Single Frame with car detection on Cam1
188a
182a
GPS Koor.
Obj 01
Inferencing Unit
190a
Processing GPS-Position interpolation, generating embedding vector.
Requst ID from Digital Twin Server
Obj 01: Embedding Vector, Location CameraID
Embedding Vector [0.55;0.34.0.78:...]
GPS Interpolation Lat123,34; Lon134,45
Single Frame with car detection on Cam2
188b
182b
190b
Embedding Vector [0.54;0.33.0.76:...]
GPS Interpolation Lat124,34; Lon132,45

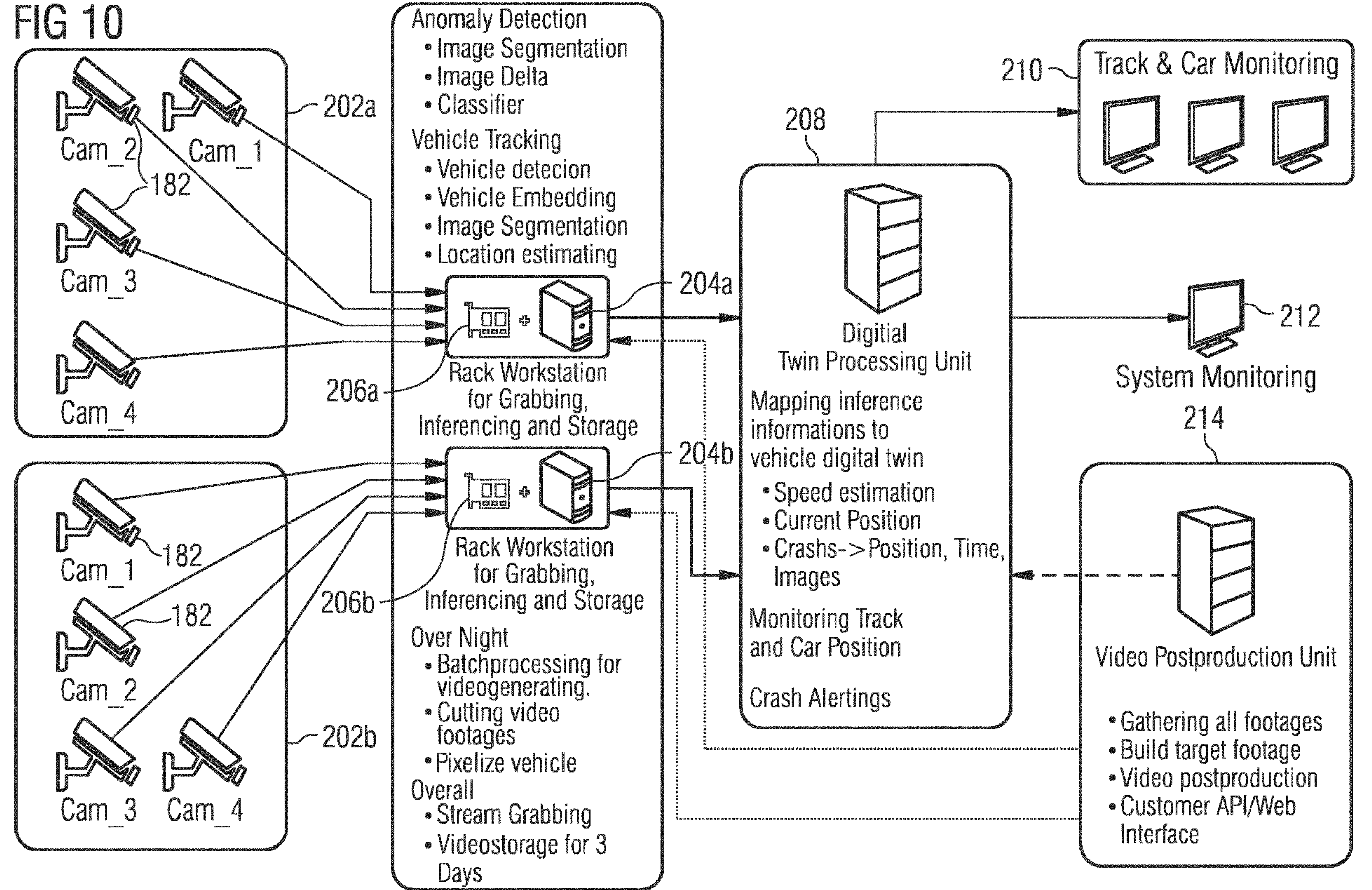
FIG 10
Cam_2
Cam_1
182
Cam_3
Cam_4
202a
Cam_1
182
Cam_2
182
Cam_3
Cam_4
202b
Anomaly Detection
• Image Segmentation
• Image Delta
• Classifier
Vehicle Tracking
• Vehicle detecion
• Vehicle Embedding
• Image Segmentation
• Location estimating
204a
206a
Rack Workstation for Grabbing, Inferencing and Storage
204b
206b
Rack Workstation for Grabbing, Inferencing and Storage
Over Night
• Batchprocessing for videogenerating.
• Cutting video footages
• Pixelize vehicle
Overall
• Stream Grabbing
• Videostorage for 3 Days
208
Digitial Twin Processing Unit
Mapping inference informations to vehicle digital twin
• Speed estimation
• Current Position
• Crashs->Position, Time, Images
Monitoring Track and Car Position
Crash Alertings
210
Track & Car Monitoring
212
System Monitoring
214
Video Postproduction Unit
• Gathering all footages
• Build target footage
• Video postproduction
• Customer API/Web Interface

AI BASED MONITORING OF RACE TRACKS

TECHNICAL FIELD

This disclosure relates to a novel, AI based monitoring system and method for race tracks such as race tracks used for professional and amateur car racing.

BACKGROUND

Race tracks, in particular car race tracks such as the North Loop of the Nürburgring often feature many turns, including blind corners, drops and significant elevation changes, making them challenging and thus potentially dangerous to drive at high speeds. Historically, in the event of an incident such as a vehicle leaving the track, race marshals relied on radio communication and communication with others marshals on the track to relay such information back to one or more race controllers and make decisions regarding track safety. In the absence of a direct line of sight, it was often difficult to assess and react to incidents quickly. With as many as several hundred vehicles simultaneously on the track, the speed and correctness of safety related decisions is crucial to protect drivers and spectators.

WO 2017/212232 A1 discloses a track monitoring apparatus and system. Specifically, it relates to a system and method of detecting whether one or more participant vehicles taking part in a race are on or have left a predetermined route or track. The system includes a series of indicating means provided in or on the track and detection means mounted on the vehicle. If the indicating means are detected by the detection means, this is taken as an indication that the vehicle has left the track and an alert or alarm can be generated and a penalty may be allocated against the identified vehicle.

U.S. Pat. No. 6,020,851 A discloses another race monitoring system. It provides an auto race monitoring system that provides a race track with a ground positioning system which includes at least three transmitters, transmitting signals to be received by at least a pair of receivers in each of the race cars. Those receivers instantaneously determine their position and, accordingly, exact position and attitude of the race car upon the race track. That information, along with data respecting race car parameters such as vehicle speed, engine temperature and oil pressure, are sent by a transmitter to a receiver interconnected with a main frame computer such that a viewer can select any particular race car which he desires to monitor at any particular time in the race.

US 2018/341812 A1 discloses methods and systems for automatically tracking and analyzing imagery data of at least one vehicle on a racetrack comprising: A video event management system with a plurality of video cameras positioned around a racetrack determines the presence of the at least one vehicle and based on a weighted event score corresponding to dynamics for the at least one vehicle and other objects captures video imagery and stills and generates at least one subframe. Excess video imagery data and excess stills data are discarded based on metadata of linked subframes.

While the above monitoring systems can be beneficial in race monitoring and control, they require specialized equipment to be installed within the vehicle and therefore not suitable for all types of races and racing vehicles. Moreover, due to the specialized sensing technology, they are relatively expensive and difficult to implement, especially on large race tracks. Accordingly, there is a need to provide an improved monitoring system and method for race tracks, which are suitable for many types of races and race participants and, preferably, simple and cost-effective to implement.

SUMMARY

We provide a method of monitoring a race track including obtaining at least one sequence of images from a track-side camera capturing at least one section of the race track; segmenting images of the sequence of images into different areas associated with the race track; using automatic object recognition to detect vehicles in the sequence of images; once at least one vehicle has been detected, performing: mapping the at least one detected vehicle to at least one of the different areas associated with the race track; comparing a first image of the at least one sequence of images taken before a passage of the at least one detected vehicle with a second image of the at least one sequence of images taken after passage of the at least one detected vehicle to detect anomalies along the race track; classifying any detected anomaly based on automatic pattern recognition; mapping any detected anomaly to at least one of the different areas associated with the race track; and activating at least one warning device based on at least one set of rules, wherein the at least one set of rules comprises a first rule triggering a first warning if the at least one detected vehicle is mapped to a first predefined area of the race track, a crash barrier or an out-of-bounds area, and a second rule triggering a warning if the detected anomaly is mapped to a second predefined area of the race track.

We also provide a monitoring system for a race track including one or more track-side cameras, each camera having a field of view covering at least one section of the race track; an image capturing system configured to obtain at least one sequence of images from at least one of the track-side cameras; one or more warning devices configured to be activated when a first warning and/or a second warning is triggered; and an image processing system comprising at least one processor configured to: segment images of the sequence of images into different areas associated with the race track; use automatic object recognition to detect vehicles in the sequence of images; map any detected vehicle to at least one of the different areas associated with the race track; compare a first image of the at least one sequence of images taken before a passage of at least one detected vehicle with a second image of the at least one sequence of images taken after the passage of the at least one detected vehicle to detect anomalies along the race track; classify any detected anomaly based on automatic pattern recognition; map any detected anomaly to at least one of the different areas associated with the race track; and trigger the first warning if the at least one detected vehicle is mapped to a first predefined area of the race track, and/or trigger the second warning, if the detected anomaly is mapped to a second predefined area of the race track.

We further provide a method of monitoring a race track including obtaining at least one sequence of images from a camera capturing at least one section of the race track; detecting at least one vehicle in the sequence of images using automatic object recognition; re-identifying at least one detected vehicle as a specific vehicle of a predetermined set of vehicles using embedding, comprising computing at least one reference embedding vector for the embedding based on at least one image taken when the at least one detected vehicle entered the race track or the monitored part of the race track; mapping the re-identified vehicle to a corresponding digital twin in a digital representation of the race track; and showing an estimated position of the re-identified vehicle in the digital representation of the race track.

BRIEF DESCRIPTION OF THE DRAWINGS

FIGS. 6A to 6D show, in a schematic way, training and inference using embedding vectors for object re-identification.

FIG. 10 shows, in a schematic way, a system architecture of a monitoring system for a race track.

REFERENCE SIGNS

Figure 1:
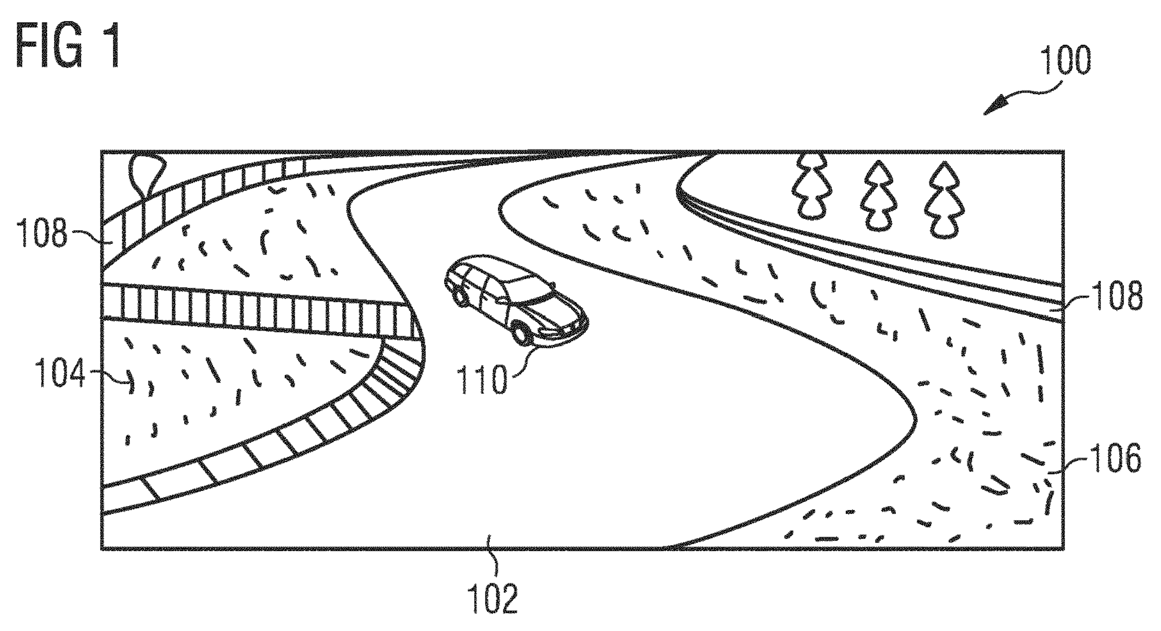
FIG. 1 shows, in a schematic way, an image of a race track captured by a track-side camera.

100 race track
102 driving surface
104 grassy area
106 gravel area
108 crash barrier
110 vehicle
120 monitoring method
121-126 method steps
130 section (of the race track)
132, 134, 136 image
138 bounding box
140 segment (of the image)
142 delta image
144 anomaly
150 reference point
160 neural network
162 input side
164 node
166 embedding vector
168 output side
170 multi-dimensional feature space
172 first embedding vector
174 second embedding vector
176 new embedding vector
178 array of vectors
180 monitoring system
182 camera
184 inferencing server
186 digital twin server
188 detection unit
190 inferencing unit
202 camera cluster
204 rack workstation
206 frame grabbing card
208 digital twin processing unit
210 track and car monitoring unit
212 system monitoring unit
214 video postproduction unit

DETAILED DESCRIPTION

Our method of monitoring of a race track, comprises:

- obtaining at least one sequence of images from a camera capturing at least one section of the race track;
- segmenting images of the sequence of images into different areas associated with the race track;
- detecting at least one vehicle in the sequence of images using automatic pattern recognition, in particular automatic object recognition;
- mapping of the at least one detected vehicle to at least one of the different areas associated with the race track; and
- activating at least one warning device based on a first set of rules, wherein the first set of rules comprises at least one first rule triggering a first warning if the at least one detected vehicle is mapped to a first predefined area of the race track such as a crash barrier or an out-of-bounds area.

We recognized that artificial intelligence (AI) based techniques such as image segmentation, object detection and positioning, can be used to automate and thus speed up the detection of incidents on a race track. Moreover, the provision of a set of rules linking detection results with related actions can greatly increase flexibility and effectiveness of race track monitoring.

Our monitoring system for a race track comprises one or more cameras, each camera having a field of view covering at least one section of the race track, an image capturing system configured to obtain at least one sequence of images from at least one of the cameras, one or more warning devices configured to be activated when a first warning is triggered, and an image processing system comprising at least one processor. The processor is configured to segment images of the sequence of images into different areas associated with the race track, detect at least one vehicle in the sequence of images using automatic pattern recognition, in particular object recognition, map the at least one detected vehicle to at least one of the different areas associated with the race track, and, based on a first set of rules, trigger the first warning if the at least one detected vehicle is mapped to a first predefined area of the race track.

Our monitoring system and method enable:

- automatic detection of critical situations along the track, including a deviation of a vehicle from the race track and/or collision with a guide plank, a loss of oil, a person or other object on the race track or the like;
- automatic reactions to critical situations, including activating warning and control signals, outputting messages on panels placed along the track, selecting, outputting and/or recording video footage of related sections of the race track;
- rule based definition and association of the automatic detection and/or automatic reactions;
- tracking of vehicles along the race track, including storage of the driven track; and
- automatic mapping of detected critical situations to one or more tracked vehicles involved in the critical situation; and/or
- automatic generation and cutting of video footage for a tracked vehicle.

The system implements the above features based on a combination of one or more of the following electronic processing techniques:

- at least parts of the race track are monitored by a series of video cameras to generate a sequence of images;
- predefined classes of objects such as vehicles or (inacceptable) anomalies such as vehicle parts, oil, and/or gravel, are detected in the sequence of images, e.g., using an AI based object identification algorithm such as a convolutional neural network (CNN), in particular a deep learning network (DLN);
- the sequence of images is analyzed using segmentation, for example, using a segmentation mask and/or a segmentation network to identify different parts of or along the race track, e.g., a driving surface, a lane, a track boundary, a crash barrier, a run-out area, an out-of-bounds area, a pit area, a viewing area, a tarmac area, a gravel area, a dirt area, a grassy area, and a forested area;
- the detected objects are mapped to the different parts of the race track;
- based on one or more set of rules, warning devices such as flags or lights along the race track are activated either fully automatically or semi-automatically by alerting a race track official and/or race control to potentially dangerous situations such as a race car crashing into a crash barrier, or an oil spill on the driving surface;
- real-world locations of detected and optionally identified vehicles and anomalies are computed based on triangulation and interpolation of known reference points in the captured images;
- detected vehicles are identified based on training data, for example, by calculation of embedding vectors;
- digital twins of the vehicles are maintained in a digital model of the race track, comprising data such as the position or speed of each vehicle on the race track;
- detected anomalies are related to vehicles on the track, e.g., by comparing a trajectory of each car with the position and first occurrence of the detected anomaly; and/or
- image sequences related to selected events such as crashes or other incidents, or selected vehicles may be gathered and cut automatically or may be provided to race control on request.

In the following, a specific system architecture and operating method for a race track monitoring system are described.

In the system, one or more cameras provide video footage of all or part of a race track 100. As shown in FIG. 1, based on predefined rules or appropriate training, an artificial intelligence (AI) system recognizes different areas of the captured footage such as a driving surface 102, a grassy area 104, a gravel area 106 or a crash barrier 108 and divides images from the footage into corresponding segments.

The individual segments may be detected automatically using a segmentation network, e.g., based on the so-called U-Net architecture or another type of convolutional neural network (CNN) trained beforehand using images of the race track taken by track-side camera. Compared to a potential static segmentation of camera images, this allows to cover for movements, panning and zooming of the track-side cameras. Optionally, feedback information from the camera control may be used to trigger a renewed segmentation of an image stream taken by a given camera whenever the camera moves, pans, zooms or the like. The output from the respective camera may not be used by the monitoring system, while the segmentation takes place. Moreover, to improve reliability, an initial segmentation maybe performed for each camera in a known default position. The output of the segmentation stage is a pixel mask. For each pixel, the likelihood to belong to one of multiple possible classes of segments is computed. The pixel mask indicates, for each pixel, the most likely segment of the race track 100 such as the driving surface 102, the grassy area 104, the gravel area 106 and the crash barrier 108.

Alternatively, in particular when one or more cameras are mounted in fixed positions and with a fixed field of view, the segmentation may also be performed manually, i.e., statically, before the monitoring system is started. Moreover, it is also possible to provide a manual mask only for parts of a captured image, for example, for parts known to lie outside the race track 100. Masking such parts may speed up or improve the quality of a subsequent segmentation. This is also referred to as semi-automatic segmentation.

Vehicles 110 on the race track are also recognized based on artificial intelligence. For example, known object detection algorithm based on publicly available training data may be used to detect vehicles 110. For example, a deep learning network (DLN) or other type of convolutional neural network (CNN) may be used to detect vehicles, people, animals, and other objects on the racing track 100. In the system, the YOLO real-time object detection system is used for object detection. The detection precision can be improved by using additional training data captured on the relevant race track showing previous racing events and manually tagging vehicles 110 in the training data.

Based on the above steps, the disclosed system analyzes in which segments the detected vehicles 110 are. This data is passed to a rule based system, which can trigger events and alarms based on predefined rules. For example, LED panels and warnings issued along the track 100 can be generated if a blocked vehicle, a foreign object on the race track, dirt or oil on the race track are detected.

Preferably, the system can distinguish between acceptable and inacceptable anomalies. Acceptable anomalies include deviations in the captured video footage, which are caused, for example, by reflections, rain, shadows and/or illumination beams. Unacceptable anomalies relate to lost parts of vehicles 110, oil and other operational fluids or gravel or soil spread, for example, from an adjoining area onto the race track. As described below, a convolutional neural network (CNN) may be used to detect entry and exit of a known type of object such as a vehicle 110, in a given section of the race track.

Figure 2:
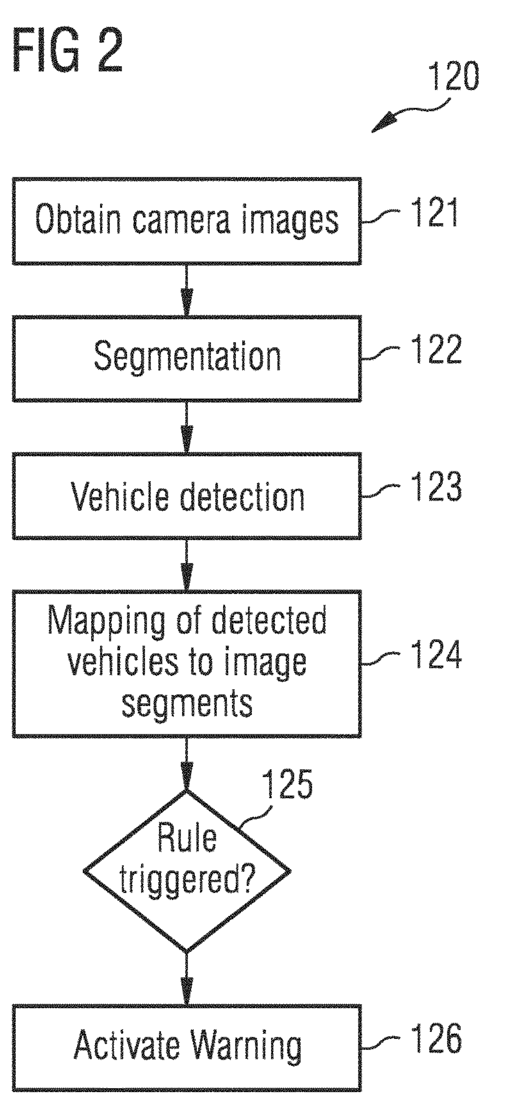
FIG. 2 shows a flow chart of a method of monitoring of a race track.

FIG. 2 shows, in the form of a flow chart, steps of a method 120 for monitoring of the race track 100.

In a step 121, at least one sequence of images is obtained from a camera capturing at least one section of the race track 100. In a step 122, an images of the sequence of images is segmented into different areas 102, 104, 106, and 108 associated with the race track 100. Segmentation may be performed based on a manually segmentation mask provided before the race starts, or an automatically or semi-automatically generated segmentation mask computed during initialisation, upon camera movements or in real-time. In a step 123, at least one vehicle 110 is detected in the sequence of images using automatic object recognition. The order of steps 122 and 123 may also be reverted, i.e., potentially moving objects may be detected first and used in aiding image segmentation process. In a step 124, the at least one detected vehicle 110 is mapped to at least one of the different areas 102, 104, 106 or 108 associated with the race track 100. In a decision step 125, it is determined whether at least one rule from a set of rules is triggered. The set of rules comprises at least one first rule triggering a first warning if the at least one detected vehicle 110 is mapped to a first predefined area of the race track 100, e.g., a crash barrier 108. If not, the method continues in step 121 with obtaining and processing the next image. However, if in step 125 at least one rule from the set of rules is triggered, at least one warning device is activated in a step 126 based on the set of rules.

In the following, different aspects of the monitoring system and monitoring method are described in more detail.

Starting with the set of rules, this may comprises a plurality of predefined, individual rules that trigger a warning. Each rule may comprise one or more conditions, determining when the rule is triggered, and one or more actions performed when the rule is triggered. Not all rules may depend on the segmentation. For example, if an animal is detected anywhere in an image, a warning may be issued regardless of whether the animal is on the driving surface 102 or not. As specific examples, the set of rules may comprise the following rules:

| Condition | Action |
|---|---|
| Object person detected on segment driving surface. | Light red signal on trackside panel. |
| Object vehicle detected on segment gravel area. | Light yellow signal on trackside panel. |
| Object oil spill detected on segment driving surface. | Light red signal on trackside panel. |
| Object vehicle detected on segment crash barrier. | Display live camera signal on control monitor of race marshal. |

Figure 3A:
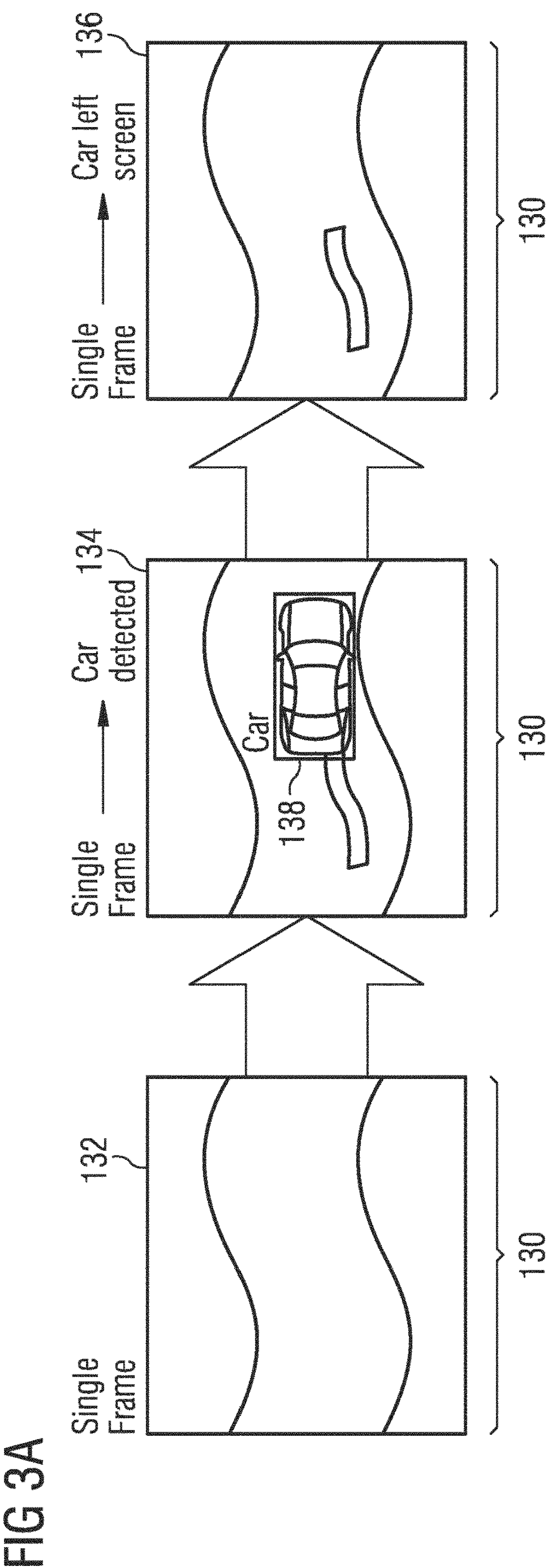
FIGS. 3A and 3B show sequences of images taken before, during and after detection of a vehicle on a segment of a race track.
Figure 3B:
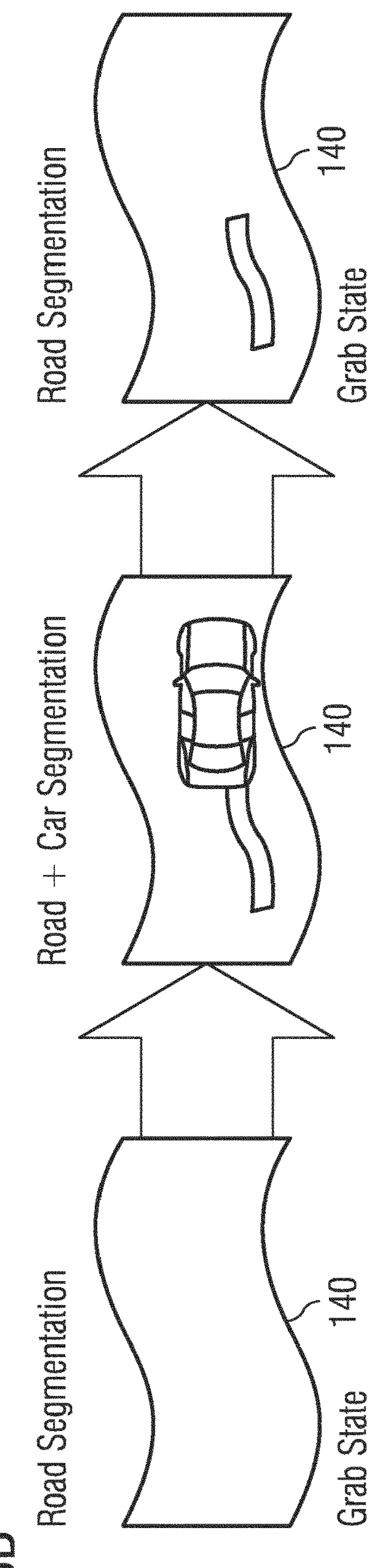
Figure 4:
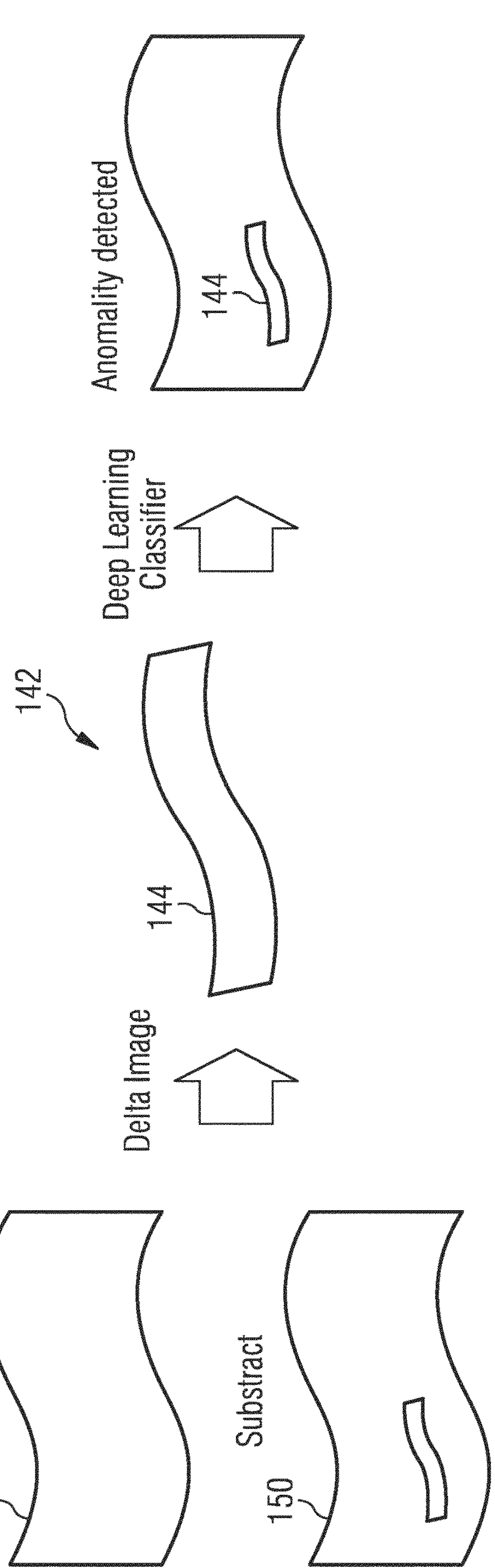
FIG. 4 shows, in a schematic way, detection of an anomaly on the segment of the race track of FIG. 3.

As shown in FIGS. 3A, 3B and 4, the detection of anomalies may be triggered whenever a vehicle 110 enters a monitored section 130 of the track 100. Thereafter, a differential analysis of the race track 100 before and after the vehicle 110 has passed the relevant section 130 of the track 100 can be performed. Again this detection may be based on artificial intelligence and suitable training data. For example, the system may be trained with the above acceptable anomalies as well as inacceptable anomalies based on previous race events and manual tagging of acceptable and inacceptable deviations in the historic footage.

In addition to the tagging of historic footage, anomalies may be artificially created, for example, by placing a foreign object on the race track 100 and marking it as an unacceptable anomaly. To improve the detection rate, images of both acceptable and unacceptable anomalies should be taken in different weather conditions.

As shown in FIG. 3A, a sequence of images 132, 134 and 136 shows the same section 130 of the race track 100 before, during and after passage of a vehicle 110 as detection by the object detection system. Processing may be triggered by the successful detection of a car or other vehicle 110 within the image 134 provided by a camera, and captured by a frame grabber. Once a vehicle 110 has been detected, the images 132 and 136 may be selected from the captured video material. For example, the last image in a time sequence of images taken before a bounding box 138 surrounding the detected vehicle 110 enters the section 130 may be selected as first image 132. Equally, the first image in the time sequence of images taken after the bounding box 138 surrounding the detected vehicle 110 leaves the section 130 may be selected as third image 136.

FIG. 3B shows the same sequence of images 132, 134 and 134 after segmentation. In the depicted example, the used segmentation algorithm extracts only a single segment 140 corresponding to the driving surface 102 of the race track. As shown in the bottom middle, the detected vehicle 110 is positioned within the segment 140, i.e., on the race track 100. Thus, no alarm is raised at this stage.

As shown in FIG. 4, once the detected vehicle 110 leaves the section 130, a comparison between segments of interest may be performed. In particular a delta image 142 between the segment 140 in the first image 132 and the same segment 140 in the third images 136 may be computed. The delta image 142 is classified using a deep learning classifier to decide whether the delta image corresponds to or comprises at least one known anomaly 144.

In the example, an oil spill left by the passing vehicle 110 is detected. Accordingly, a corresponding warning may be activated for all of the race track 100 or at least the section 130 comprising the anomaly 144. Depending on the severity of the detected anomaly and/or an associated uncertainty of the detection algorithm, the warning may be triggered automatically by the monitoring system, i.e., without human intervention, or displayed to a race marshal or similar official for verification, with the option to either raise or suppress the warning.

As a further feature, the positions of the vehicles 110 on the race track 100 may be determined and, optionally, tracked along the course. For this purpose, real-world positions, for example, GPS coordinates of reference points visible in the monitored section 130 of the tracks 100, may be recorded. Then, based on triangulation and similar interpolation techniques, detected objects such as vehicles 110 and anomalies 144 along the monitored section 130 of the track 100 can be related to the previously recorded position of reference points. That is to say, a reference point maps an image position defining a single pixel or a group of pixels, collectively referred to as pixel area, of a digital image of the race track 100 to a corresponding real-world position on the race track 100.

Figure 5:
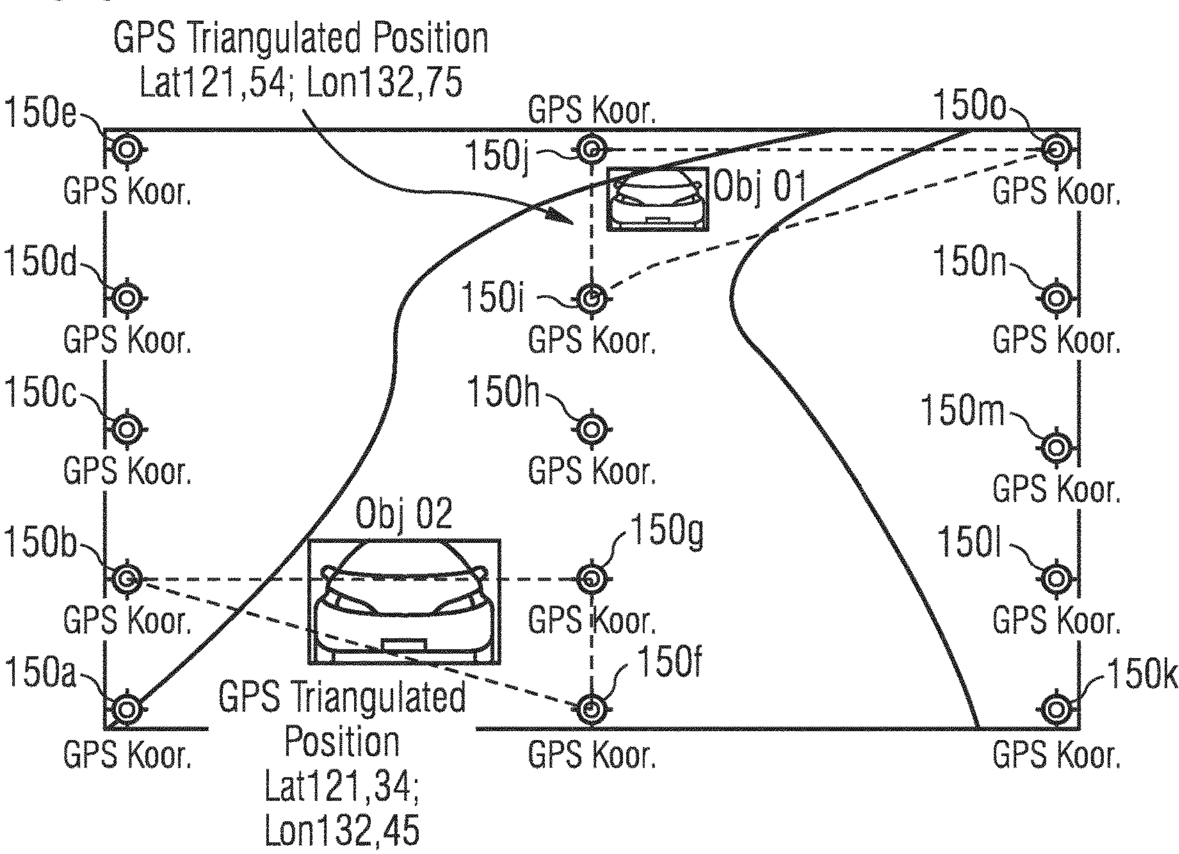
FIG. 5 shows, in a schematic way, a triangulation method of positioning a detected object within a scene.

This is shown in detail in FIG. 5. Within another section 130 of the race track 100, a total of 15 reference points 150 are provided. In the depicted example, the reference points 150 form a fixed grid of three times five reference points 150. This may be useful, for example, when a position, direction and angle of a camera capturing the section 130 is fixed. In this example, during set-up or training, a GPS or similar position device with a visible marker may be placed at each reference point 150 in turn to determine its exact real-world position. Alternatively, the reference points 150 may coincide with prominent, high contrast features with in the section 130, i.e., edges or corners of segment boundaries, special objects like flagpoles or the like. Such reference points can be easily identified in a video image of the section 130, even if the camera moves, pans, or zooms in and out. Again, the real-world position of such prominent features is measured and stored during set-up or training, and used for triangulation during normal operation of the system.

In the situation depicted in FIG. 5, two vehicle 110*a* and 110*b* have been detected in section 130. To determine their position, three or more reference points 150 in their vicinity are used to estimate their current position. As shown, reference points 150*i*, 150*j* and 1500 closest to a center of a first bounding box 138*a* of the first vehicle 110*a* are used to estimate the present position of the first vehicle 110*a* by triangulation. Similarly, reference points 150*b*, 150*f* and 150*g* closest to a center of a second bounding box 138*b* of the second vehicle 110*b* are used to estimate the present position of the second vehicle 110*b*.

Accordingly, the position of detected vehicles 110 and anomalies 144 can be displayed on a visual representation of the race track 100, e.g., at the race control, where race officials work and decide on track warnings and potential interruptions of a race.

So far, a detection and optionally location of certain classes of objects, e.g., vehicles 110 and anomalies 144 was described. As detailed above, this is sufficient for generating safety warnings for the monitored race track 100. However, the described AI based monitoring system also enables some more advanced features, which are described below. In particular, it enables the re-identification of individual objects, e.g., a certain vehicle 110, on the race track. For the sake of clarity, the terms "object detection" or "object recognition" will be used to describe the mere detection of a certain type of object within a captured image such as the presence of an arbitrary race car on a monitored section 130 of the race track 100. In contrast, the term "object re-identification" will be used to describe the identification of a unique entity such as a preregistered race car of an individual race participant currently on the track.

As an additional feature, when a digital model of the race track 100 is maintained by the monitoring system, the position of each vehicle 110 may be updated continuously to create a so-called digital twin of the monitored vehicle 110 as shown, for example, in FIG. 8 described later. In the monitoring system, this is based on the re-identification of individual vehicles 110, rather than the mere detection of any vehicle 110 on the race track 100. Vehicles 110 may be distinguished based on extractable features such as form, color or other visible marks such as logos or symbols printed on the vehicle 110. Suitable training data for the automatic identification may be captured at well-defined points of the race track 100. For example, images of an individual vehicle from different positions, e.g., from the front, rear or side of the vehicles 110, may be taken when the vehicle 110 enters the race track 100 at an entrance lane for the first time. When only a part of the race track 100 is monitored, the training images may also be taken by one or more cameras monitoring a first section 130 of the race track 100. Based on this information, whenever a vehicle 110 is detected along the race track 100, the detected object can be compared to the previously captured image data, for example, by inferencing and computation of an embedding vector. Additional information may be used to improve the detection ratio, for example, OCR of registration plates, when registered vehicles 110 are racing on the race track 100.

In the example, object re-identification is implemented using a neural network 160 that has been trained offline, i.e., before the use of the monitoring system in an actual race, using an encoder/decoder model to identify specific instances from a given class of objects, e.g., individual racing cars taking part in a currently running race. Different training sets may be used to train different instances of corresponding neural networks to different classes of objects, for example, Formula 1 cars, normal road cars, motorcycles or the like. Also, when the specific properties of the objects to be identified change, e.g., due to rule changes for race competitors, training of the neural network 160 may be repeated.

The training of the neural network 160 used for object identification is conceptually shown in FIGS. 6A and 6C. During a training stage, images of different vehicles 110 are provided to an encoder or input side 162 of the neural network 160. To achieve the desired accuracy, a high number of training images is used, which are selected or confirmed manually and are taken on the actual race track 100. For the described monitoring system, a set of about 17,000 vehicles extracted from archive footage of races on the Nürburgring was used to train the neural network 160 after a review of the material by a human.

During the actual training, information received on the input side is simplified by nodes 164 of the neural network 160 to form or encode an embedding vector 166. The information of the embedding vector 166 is decoded to recreate an image on a decoder or output side 168 of the neural network 160. Weights and other settings of the neural network 160 are varied until the images on the output side 168 resemble the images provided to the input side 162 to a high degree, e.g., until a difference between becomes very small or minimal. At that stage, the neural network has learned the characteristic features of vehicles 110 or a particular subclass of vehicles 110 such as racing cars. Comparison of the input side 162 and output side 168 can be performed automatically using an appropriate similarity metric. Thus, training of the neural network 160 may be performed unsupervised.

In the example of FIG. 6A, the embedding vector 166 has only a single node 164, corresponding to a single dimension of information, e.g., the shape of an object. FIG. 6C show another neural network 160 during training, with two nodes 164 forming the embedding vector 166, corresponding, for example, to a shape and a color of the object of interest.

In practice, many more dimensions may be used to reliably identify an object such as a vehicle 110. In this context, attention is drawn to the fact that in racing often a relatively large number of very similar cars, e.g., cars of the same model, race each other, which may only differ by relatively minor details such as colors, advertisements, presence and shape of auxiliary parts such as spoilers and the like. Thus, a multi-dimensional embedding vector 166 in a multi-dimensional feature space 170 having, for example, 168 independent dimensions is used in the described system. During unsupervised training, the most significant properties for re-identification of specific vehicles 110 corresponding to each one of the nodes 164 representing a dimension of the embedding vector 166 are determined automatically by the training algorithm. Thus, they may not correspond to high-level properties such as color or shape, and may not be easily comprehensible by humans.

Once the neural network 160 is trained, it can be used to extract or infer the characteristic properties of previously unknown vehicles 110 online, e.g., in real-time during a race. This process is shown in FIGS. 6B and 6D showing the classification of input images to determine a shape, or a shape and a color of a vehicle 110. This inference is used for object re-identification during track monitoring.

Figure 7:
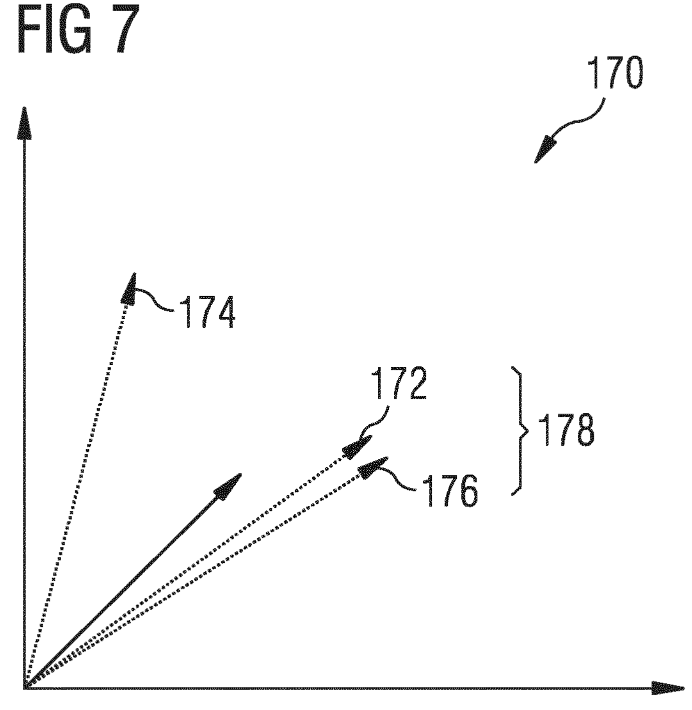
FIG. 7 shows, in a schematic way, a parameter space of an embedding vector used for vehicle re-identification.

The process of initial registration and subsequent identification of a particular vehicle 110 is also shown in FIG. 7. Before a vehicle 110 enters the race track 100, one or more images of the vehicle 110 are taken and processed by the previously trained neural network 160 to generate one or more corresponding embedding vectors 166. For example, a first vehicle 110*a* may correspond to a first embedding vector 172, and a second vehicle 110*b* may correspond to a second embedding vector 174 in a multi-dimensional feature space 170. In the system, multiple images from different perspectives of the same vehicle 110, e.g., from the front, back and side, are used to create an array of possible embedding vectors, as described later.

Then, once the vehicles 110 are on the track, parts of an image corresponding to a detected vehicle 110 can be feed to the neural network to determine a new embedding vector 176. The new embedding vector 176 may then be compared to the previously registered vectors 172 and 174. The vehicle may then be identified as the vehicle corresponding to the closest previously known embedding vector, e.g., the first vehicle 110*a* corresponding to the first vector 172. Specifically, an angle between the new embedding vector and all pre-registered embedding vectors 172 and 174 is computed and the vector with the smallest angle, e.g., the first embedding vector 172, is selected as best matching vector.

Optionally, if the new embedding vector 176 differs from the closest previously registered vectors 172 or 174 by more than a first pre-set threshold value, the new vector may be stored in the system in an array of vectors 178 corresponding to a given vehicle 110. This may be used to improve future object identification, e.g., by adding embedding vectors 176 corresponding to an image of the same vehicle 110 taken from a different angle or under different environmental conditions such as lighting or weather conditions. In the described system, up to 500 different embedding vectors can be stored for each registered vehicles. In general, this will make vehicle detection more likely and reliable.

Alternatively or in addition, if the new embedding vector 176 differs from each one of the previously registered vectors 172 and 174 by more than a second pre-set threshold value the identification may fail and/or the new embedding vector 176 is not included in the array of vectors 130. This may be used to exclude uncertain matches and/or to avoid degradation of the array of vectors 178.

The above vehicle detection and identification can be further improved if the entire track 100 is covered by video cameras. In this example, continuous tracking of each moving object will enable its detection even if some or all of its characteristics features are temporarily blocked. When not all parts of the race track 100 are covered by respective cameras and/or if movable cameras are used and do not cover a vehicle 110 of interest at any given moment, based on a digital model of the race track 100, certain logical assumptions about the likelihood of a vehicle 110 appearing in a certain area of the race track 100 may be used to improve the detection precision.

Figure 8A:
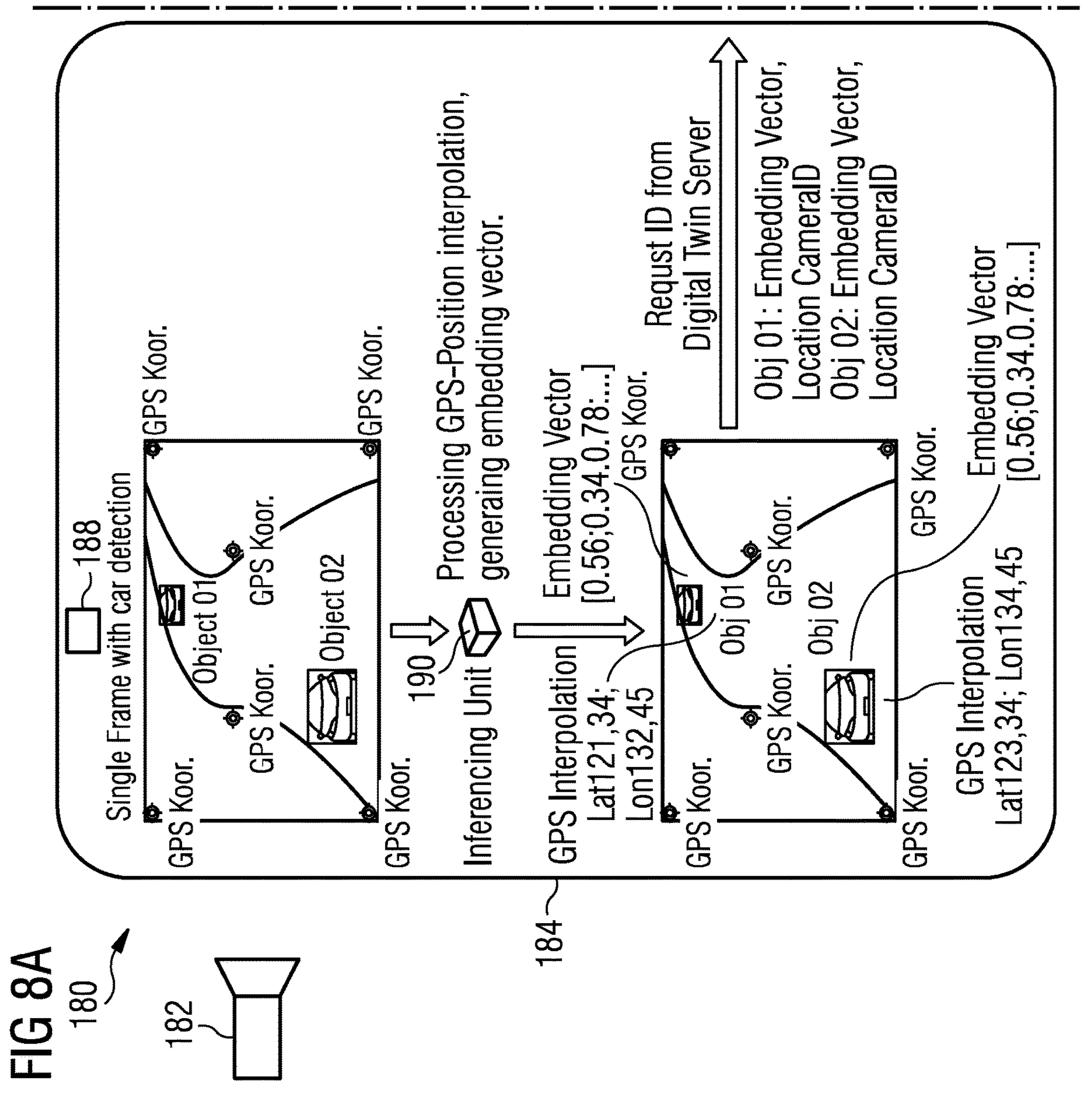
FIGS. 8A and 8B show, in a schematic way, the collaboration between an inferencing server and digital twin server based on images from a single camera.
Figure 8B:
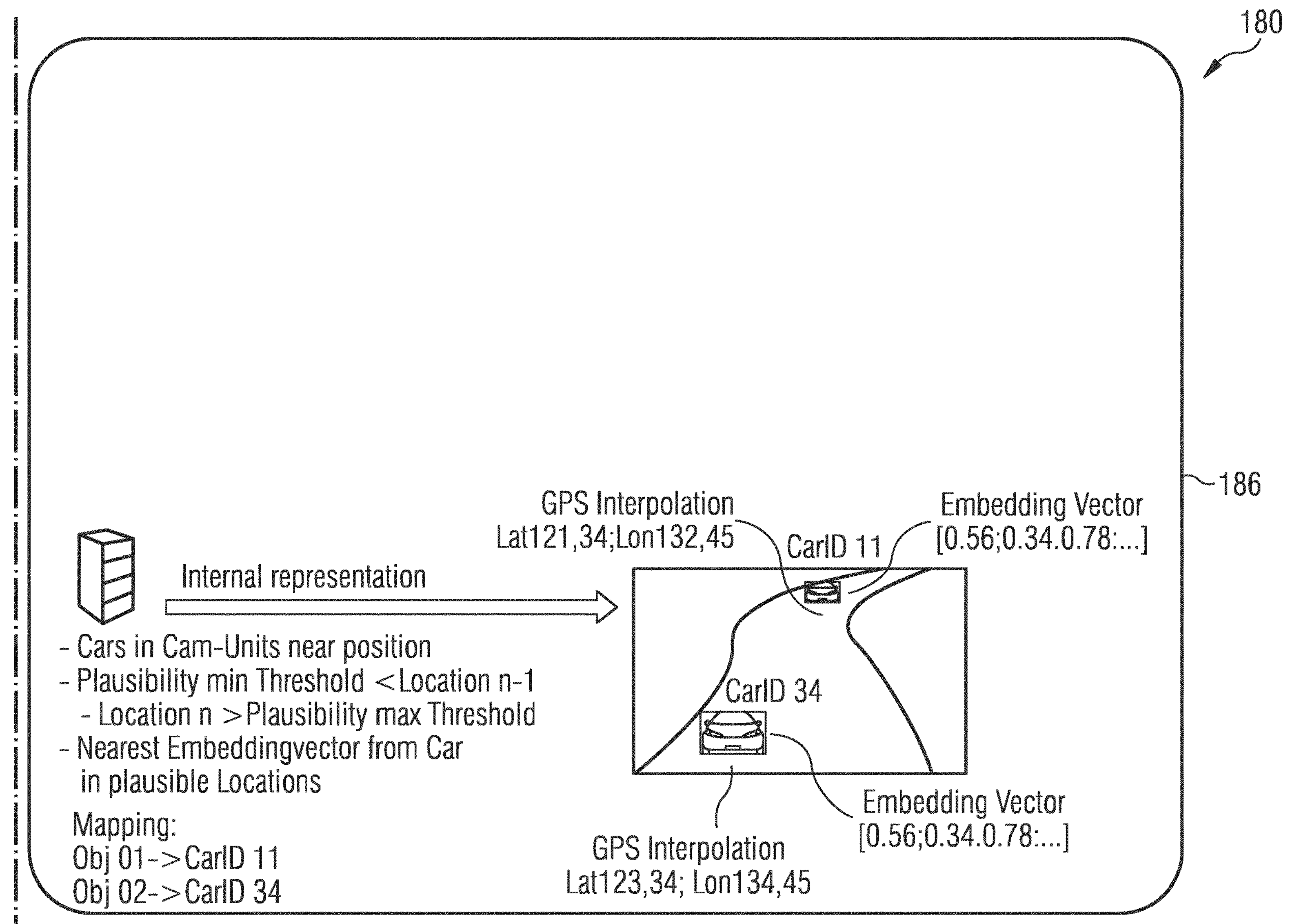

FIG. 8 shows a specific setup and operation of a monitoring system 180. The system 180 comprises a camera 182 capturing a corresponding section 130 of the race track 100. The system 180 further comprises an inferencing server 184 and a digital twin server 186.

The inferencing server 184 capture digital images or video frames provided by the camera 182 and stores them for later use. At least a subset of the captures images are fed into an AI based object detection 188 unit to identify predetermined types of objects such as vehicles 110. As shown in FIG. 8, each identified object is surrounded by a corresponding bounding box 138.

In addition, the detection unit 188 also performs segmentation of the received camera images. For example, the image of the track section 130 may be subdivide into areas corresponding to a driving surface 102, a grassy area 104 and a gravel area 106, respectively.

The inferencing server 184 further comprises an inferencing unit 190. The inferencing unit 190 is setup to determine the position of the detected vehicles based on GPS position interpolation using known reference points 150 within the section 130.

The inferencing unit 190 is further setup to generate an embedding vector for each detected vehicle 110 using the neural network 160. The determined embedding vector, together with a real-world position of the detected vehicle 110 on the race track 100 and/or an identifier of the camera, which captured the image, is passed to the digital twin server 186 for identification.

The digital twin server may use multiple plausibility checks to identify each of the vehicles 110*a* and 110*b*. Generally, the set of embedding vectors used for matching can be restricted to those vehicles 110 known to be on the track 100. Moreover, in a step 1, based on the identifier of the camera, it may only select a subset of vehicles 110 likely to be in view of that camera. This can be achieved, for example, by only considering vehicles that have already passed another camera located on an earlier section of the race track 100. For example, the subset of vehicles used in the identification process may be limited to vehicles that were last identified successfully in one of two or three sections of the track covered by other cameras. Including more than one up-track camera addresses the fact that some vehicles 110 may be covered in certain camera settings, or may not be identified successfully due to difficult light conditions or camera angles.

Alternatively or in addition, in a step 2, the selection may be refined based on the real-world positions provided by the inferencing server 184. For example, based on an estimated speed of a vehicle 110 in the digital model, only those vehicles which could have plausibly reached a certain real-world position within a captured image at the time the image was taken may be considered for matching.

Reduction of the number of vehicles 110 used during identification to a predetermined subset reduces the required processing power, and may thereby enable real-time identification with a relatively high resolution of input images during racing at high speeds. The higher resolution and reduction of plausible matches, also improves detection precision. For example, when two very similar vehicles, e.g., of the same model and color, are taking part in the same race, but are located on different sections 140 of the race track 100, object identification is greatly improved compared to general real-time identification engines.

In a step 3, after such filtering, the digital twin server selects the embedding vector that comes closets, in the multi-dimensional feature space 170, to the new embedding vector 176 provided by the inferring server 184 (see FIG. 7) to identify the first vehicle 110*a* as a racing car with a given identifier, i.e., CarID 11, and the second vehicle 110*b* as another racing car with a given identifier, i.e., CarID 34.

Figure 9A:
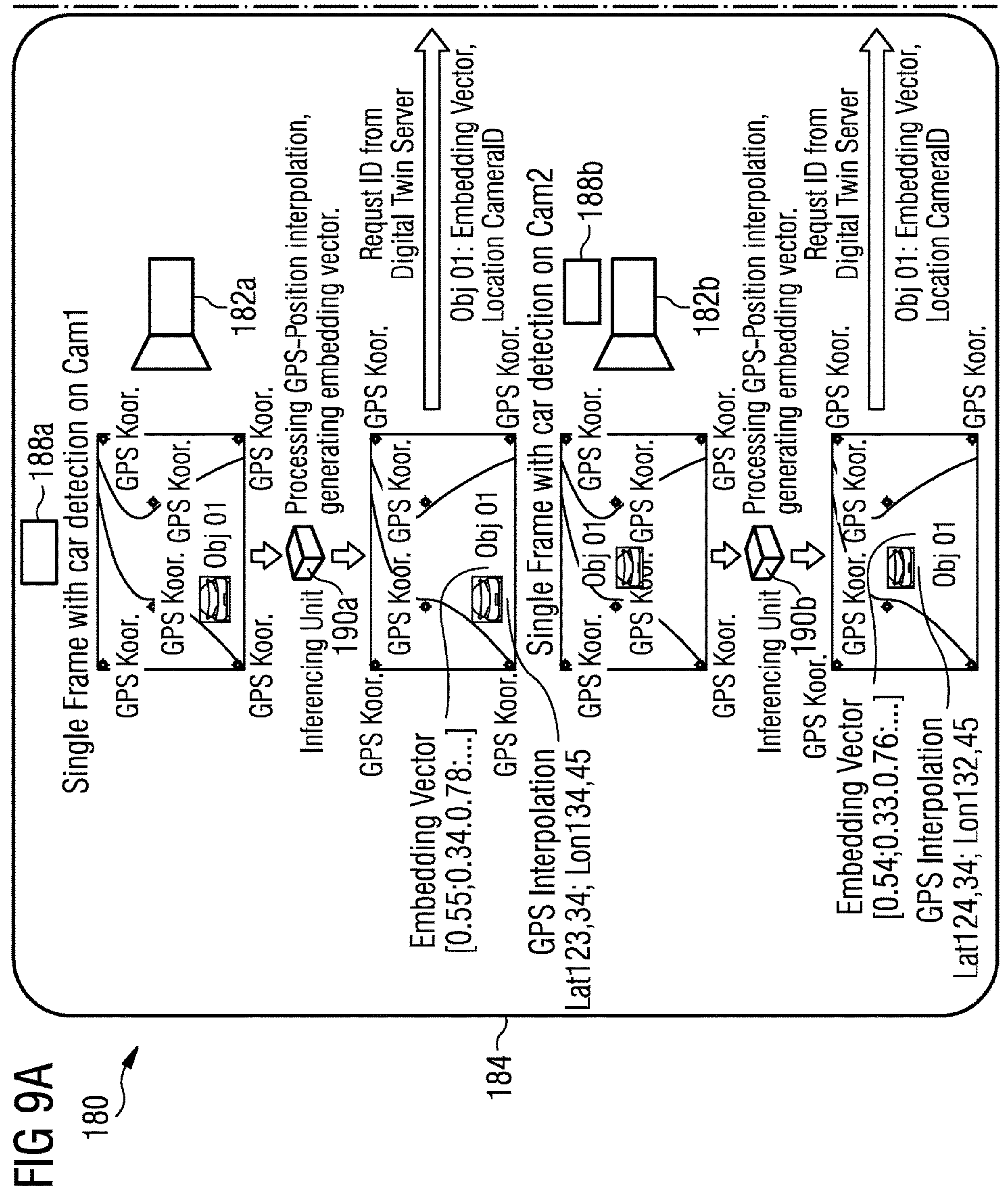
FIGS. 9A and 9B show, in a schematic way, the collaboration between the inferencing server and the digital twin server based on images from two cameras.
Figure 9B:
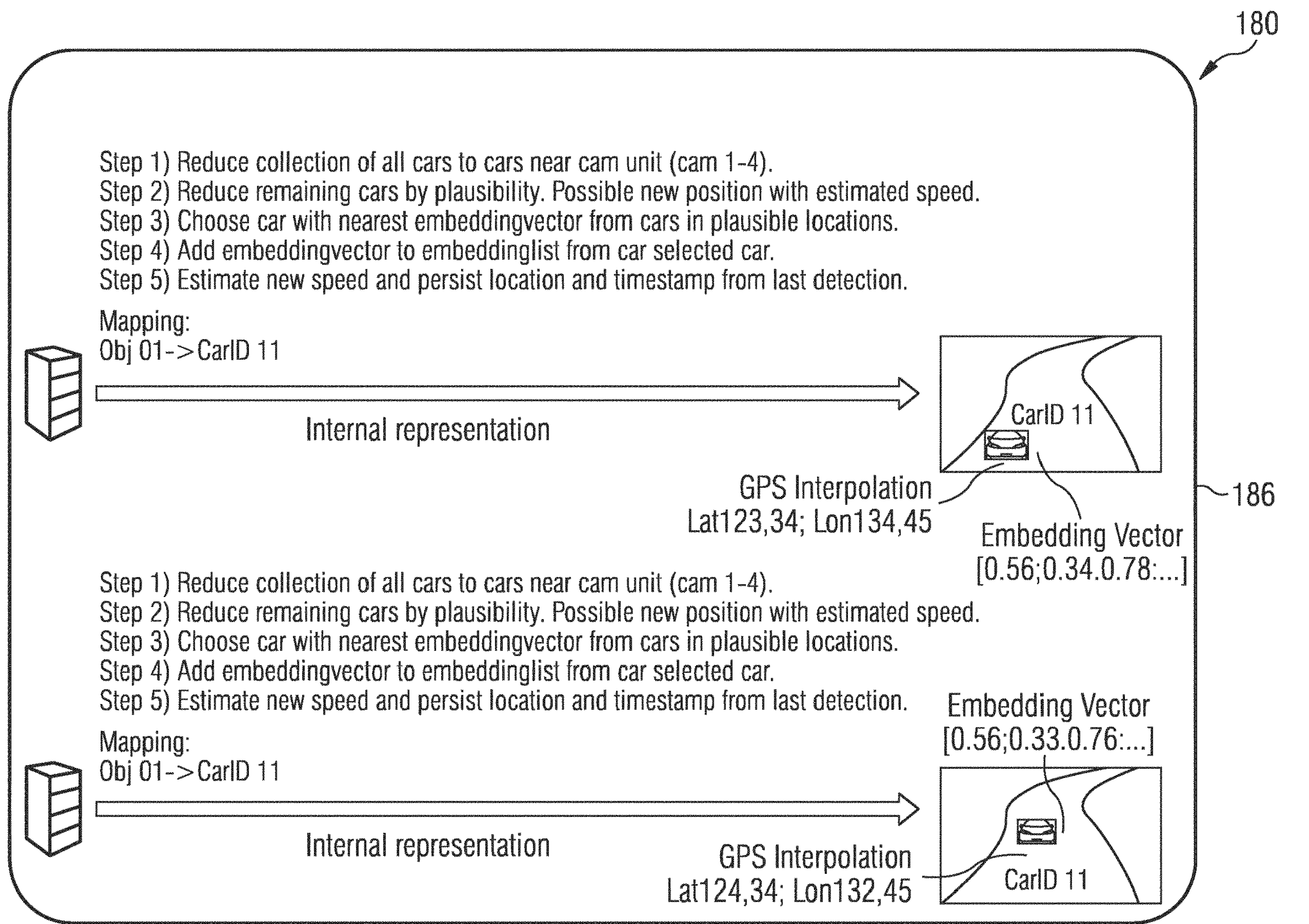

FIG. 9 shows another configuration of the detection system 180, comprising two cameras 182*a* and 182*b*, corresponding to two different track sections 130*a* and 130*b*. For each location, essentially the same steps as those detailed above with respect to FIG. 8 are performed. Details are not repeated here.

In addition, after successful identification of a vehicle 110, in a step 4, an array of vectors 178 used to represent the identified car is updated as described before with reference to FIG. 7. In particular, the new embedding vector 176 is added to the array 178, if it differs significantly from all vectors in the array. When the array 178 reaches a maximum size, another embedding vector may be deleted from the array, e.g., a vector quite similar to another vector of the array, or a vector lying entirely within the vector space defined by other vectors of the array 178.

Moreover, in a step 5, the information passed from the inference server 184 is then used to update a digital twin of the respective vehicles. For example, its last known location, speed, position in the race order or the like may be updated based on the renewed identification of the vehicle at its new, present location. In the described system, all positions, estimated speeds, and other relevant information are stored persistently together with a time-stamp corresponding to the moment in time when a corresponding digital image was taken. In this way, the estimated position and speed of the vehicles can be shown live in the digital model. Moreover, a race can be reconstructed with the digital model, e.g., for race analysis, identification of drivers responsible for accidents or the anomalies 144 along the race track 100.

The above techniques also allow further functions to be implemented. For example, when both anomalies 144 and vehicle trajectories are detected and maintained by the system 180, it is possible to identify a vehicle 110 responsible for an anomaly 144 such as a lost part or oil spill on the race track, and to hold the driver or owner of the vehicle 110 responsible.

Moreover, when a driver or other person is interested in video footage of a particular event such as a crash, or all available footage of a selected car on the race track 100, such video sequences can be selected and cut automatically and be provided to the interested party.

FIG. 10 shows a potential architecture to implement the above functionality. However, as detailed above, each of the described functions can be implemented and used individually, if desired.

The monitoring system 180 of FIG. 10 comprises two camera clusters 202*a* and 202*b* of four cameras 182*a* to 182*d* each. The cameras of each camera cluster 202 are connected to a corresponding rack workstation 204*a* and 204*b*, comprising one or more frame grabbing cards 206. Among other, the rack workstation 204 are responsible for grabbing essentially all video output of the respective camera cluster 202. In the described system, the video footage is stored for three days for analysis and post-processing as detailed below. In addition, the rack workstation 204 perform further, different tasks during race monitoring and at other times, when no race currently takes place.

At race time, the rack workstation 204 perform anomaly detection based on image segmentation, delta image computation and anomaly classification as detailed above. Moreover, the also perform vehicle tracking based on vehicle detection, vehicle embedding, image segmentation and location estimation as detailed above.

At other times, for example, during the night, the perform computationally expensive tasks such as batch processing for video generation, cutting of video footages for individual vehicles or drivers, and pixelization of other vehicles or their registration numbers, e.g., for data protection.

A digital twin processing unit 208 maps the inference and other information provided by the rack workstation 204 to a corresponding digital twin of the race track 100 and/or each individual vehicle 110. In particular, it keeps track of a speed estimation and current position of each vehicle 110. It further records the position, time and corresponding images of any detected incident, in particular crash of any vehicle 110. The digital twin processing unit 208 further monitors a state of the race track 100 and the positions of the vehicles 110 on the track.

In the example, digital twin processing unit 208 also executes a rule engine. As explained before, the rule engine generates alerts corresponding to detected incidents such as vehicles crashes, and may control flags, display and other notifications along the track. Further vehicle information may be provided from the digital twin to the rule engine. This enables to formulate rules based on dynamic properties of the monitored system. For example, a rule may be triggered if a calculated speed of a vehicle lies below or above a certain threshold.

The monitored track state and car positions are provided from the digital twin processing unit 208 to a track and car monitoring unit 210, e.g., for the benefit of race marshals or as information for the audience.

A system monitoring unit 212 is provided to control and review the operation of the monitoring system 180 itself. It may show operational state of the software and hardware components of the monitoring system.

Finally, a video postproduction unit 214 is provided, which is configured to gather all or selective footage from all the cameras 182, built target footage, e.g., of a specific vehicle 110 or vehicle group, e.g., the vehicles leading the race or involved in a particular incident, control video postproduction. It may also provide a customer API or web interface, allowing registered users to request and retrieve video material relevant to their own vehicle 110.

Our monitoring system is flexible, as both the training data as well as the rules set for detection, classifying and triggering can be continuously updated. Moreover, it does not require the installation of specific hardware such as RFID based transponders as used in professional races, on or in the vehicles taking part in a race. Accordingly, our monitoring system is particularly useful for amateur races with private vehicles, rather than professional races.

The invention claimed is:

1. A method of monitoring a race track comprising:
- obtaining at least one sequence of images from a track-side camera capturing at least one section of the race track;
- segmenting images of the sequence of images into different areas associated with the race track;
- using automatic object recognition to detect vehicles in the sequence of images;
- once at least one vehicle has been detected, performing:
  - mapping the at least one detected vehicle to at least one of the different areas associated with the race track;
  - comparing a first image of the at least one sequence of images taken before a passage of the at least one detected vehicle with a second image of the at least one sequence of images taken after passage of the at least one detected vehicle to detect anomalies along the race track;
  - classifying a detected anomaly based on automatic pattern recognition;
  - mapping the detected anomaly to at least one of the different areas associated with the race track;
  - activating at least one warning device based on at least one set of rules, wherein the at least one set of rules comprises a first rule triggering a first warning if the at least one detected vehicle is mapped to a first predefined area of the race track, a crash barrier or an out-of-bounds area, and a second rule triggering a warning if the detected anomaly is mapped to a second predefined area of the race track;
- re-identifying the at least one detected vehicle as a specific vehicle of a predetermined set of vehicles using embedding; and
- mapping the re-identified vehicle to a corresponding digital twin in a digital representation of the race track,
- wherein the predetermined set of vehicles corresponds to a subset of all vehicles having corresponding digital twins in the digital representation of the race track, and
- the subset is selected based on a set of rules providing a likelihood of re-identifying a given vehicle in a sequence of images corresponding to the at least one section of the race track based on the data of the corresponding digital twin.

2. The method of claim 1, wherein the areas of the race track comprise at least one of: a driving surface, a lane, a track boundary, a crash barrier, a run-out area, an out-of-bounds area, a pit area, a viewing area, a tarmac area, a gravel area, a dirt area, a grassy area, and a forested area.

3. The method of claim 1, wherein the detected anomaly is classified as acceptable, if it is classified as one or more rain drops, leaves, reflections, shadows, and/or light beams; and/or the detected anomaly is classified as unacceptable, if it is classified as a vehicle part, oil, and/or gravel.

4. The method of claim 1, wherein the first image is a last image in a time sequence of images taken before a bounding box surrounding the at least one detected vehicle entered the section of the race track and the second image is a first image in the time sequence of images taken after the bounding box surrounding the at least one detected vehicle left the section of the race track.

5. The method of claim 1, further comprising:

locating a first position of the at least one detected vehicle;

locating a second position of the detected anomaly; and displaying the first position and the second position on a visual representation of the race track.

6. The method of claim 1, further comprising:

computing at least one reference embedding vector for the embedding based on at least one image taken when at least one vehicle enters the race track or a monitored part of the race track.

7. The method of claim 6, further comprising:

extracting at least one characteristic feature, a number plate or other registration number of the at least one vehicle, from the at least one image taken when the at least one vehicle enters the race track, wherein the at least one characteristic feature is used in the step of re-identifying the at least one vehicle.

8. The method of claim 1, further comprising:

selecting a plurality of sequences of images from a plurality of cameras capturing different sections of the race track based on the re-identification of at least one specific vehicle in each one of the plurality of sequences; and cutting the plurality of sequences to generate footage of the at least one specific vehicle driving along the race track.

9. The method of claim 1, further comprising:

determining a first real-world position of at least one re-identified vehicle based on a mapping relationship; and/or determining a second real-world position of the at least one anomaly detected based on the mapping relationship, wherein the mapping relationship maps a plurality of pixel areas in the images of the at least one sequence of images to a corresponding plurality of real-world positions of the corresponding section of the race track captured by the camera.

10. The method of claim 9, further comprising:

mapping the re-identified vehicle to a corresponding digital twin in a digital representation of the race track; and adding first position and timestamp information to the corresponding digital twin each time a first real-world position of a re-identified vehicle is determined to store a trajectory of the respective vehicle in the digital representation of the race track.

11. The method of claim 10, further comprising:

adding second position and timestamp information to a corresponding digital representation of at least one unacceptable anomaly detected along the race track; and correlating the first and second position and timestamp information by comparing the trajectories of re-identified vehicles with a position and a first occurrence of the detected anomaly in the sequence of images to identify a vehicle likely to have caused the at least one unacceptable anomaly.

12. A monitoring system for a race track comprising:

one or more track-side cameras, each camera having a field of view covering at least one section of the race track;

an image capturing system configured to obtain at least one sequence of images from at least one of the track-side cameras;

one or more warning devices configured to be activated when a first warning and/or a second warning is triggered; and an image processing system comprising at least one processor configured to:

segment images of the sequence of images into different areas associated with the race track;

use automatic object recognition to detect vehicles in the sequence of images;

map any detected vehicle to at least one of the different areas associated with the race track;

compare a first image of the at least one sequence of images taken before a passage of at least one detected vehicle with a second image of the at least one sequence of images taken after the passage of the at least one detected vehicle to detect anomalies along the race track;

classify a detected anomaly based on automatic pattern recognition;

map the detected anomaly to at least one of the different areas associated with the race track;

trigger the first warning if the at least one detected vehicle is mapped to a first predefined area of the race track, and/or trigger the second warning, if the detected anomaly is mapped to a second predefined area of the race track;

re-identifying the at least one detected vehicle as a specific vehicle of a predetermined set of vehicles using embedding; and mapping the re-identified vehicle to a corresponding digital twin in a digital representation of the race track, wherein the predetermined set of vehicles corresponds to a subset of all vehicles having corresponding digital twins in the digital representation of the race track, and the subset is selected based on a set of rules providing a likelihood of re-identifying a given vehicle in a sequence of images corresponding to the at least one section of the race track based on the data of the corresponding digital twin.

13. A method of monitoring a race track comprising:

obtaining at least one sequence of images from a camera capturing at least one section of the race track;

detecting at least one vehicle in the sequence of images using automatic object recognition;

re-identifying at least one detected vehicle as a specific vehicle of a predetermined set of vehicles using embedding, comprising computing at least one reference embedding vector for the embedding based on at least one image taken when the at least one detected vehicle entered the race track or the monitored part of the race track;

mapping the re-identified vehicle to a corresponding digital twin in a digital representation of the race track; and showing an estimated position of the re-identified vehicle in the digital representation of the race track;

wherein the predetermined set of vehicles corresponds to a subset of all vehicles having corresponding digital twins in the digital representation of the race track, and the subset is selected based on a third set of rules providing a likelihood of re-identifying a given vehicle in a sequence of images corresponding to the at least one section of the race track based on the data of the corresponding digital twin;

determining a first real-world position of at least one re-identified vehicle based on a mapping relationship; and determining a second real-world position of the at least one anomaly detected along the race track based on a comparison of a first image of the at least one sequence of images taken before a passage of the at least one detected vehicle with a second image of the at least one sequence of images taken after the passage of the at least one detected vehicle based on the mapping relationship, wherein the mapping relationship maps a plurality of pixel areas in the images of the at least one sequence of images to a corresponding plurality of real-world positions of the corresponding section of the race track captured by the camera.

14. The method of claim 13, further comprising:

segmenting images of the sequence of images into different areas associated with the race track;

mapping the at least one detected vehicle to at least one of the different areas associated with the race track; and activating at least one warning device based on a first set of rules, wherein the first set of rules comprises at least one first rule triggering a first warning if the at least one detected vehicle is mapped to a first predefined area of the race track, a crash barrier or an out-of-bounds area.

15. The method of claim 13, wherein the predetermined set of vehicles comprises individual vehicles taking part in a race, and re-identification of the at least one vehicle is implemented using a neural network that has been trained offline or before the use of the monitoring system to detect the at least one vehicle in the sequence of images in the race, using an encoder/decoder model to identify specific vehicles from a given class of objects, Formula 1 cars, normal road cars, or motorcycles.

16. The method of claim 15, wherein training of the neural network is performed unsupervised, and comprises:

receiving images on an input side of the neural network and simplifying the received images by nodes of the neural network to form or encode an embedding vector;

decode information of the embedding vector to recreate an image on a decoder or output side of the neural network;

varying weights and other settings of the neural network until a difference between the images received on the input side and the recreated-images becomes very small or minimal, based on an automatic comparison of the input side and output side using a similarity metric.

17. The method of claim 15, further comprising:

in a training stage, providing a high number of training images of different vehicles to an encoder or input side of the neural network, including training images selected or confirmed manually and taken on the race track;

during an initial registration stage before the at least one vehicle enters the race track, taking and processing, by the previously trained neural network the least one image of at least one vehicle to compute the at least one reference embedding vector; and during re-identification of the at least one vehicle once the at least one vehicle is on the race track, feeding parts of an image corresponding to the at least one detected vehicle to the neural network to determine a new embedding vector, comparing the new embedding vector with a set of previously registered embedding vectors, comprising the at least one reference embedding vector, and identifying the at least vehicle as the vehicle corresponding to the closest one of the set of previously registered embedding vectors.

18. The method of claim 17, wherein if the new embedding vector differs from the closest previously registered embedding vectors by more than a first pre-set threshold value, the new embedding vector is stored in an array of vectors corresponding to a given vehicle; and/or if the new embedding vector differs from each one of the previously registered embedding vectors by more than a second pre-set threshold value, failing the identification and/or not including the new embedding vector in the array of vectors.

19. The method of claim 13, further comprising:

extracting at least one characteristic feature, a number plate or other registration number of the at least one vehicle, from the at least one image taken when the at least one vehicle entered the race track or the monitored part of the race track, wherein the at least one characteristic feature is used in the step of re-identifying the at least one vehicle.

20. The method of claim 13, further comprising:

selecting a plurality of sequences of images from a plurality of cameras capturing different sections of the race track based on the re-identification of at least one specific vehicle in each one of the plurality of sequences; and cutting the plurality of sequences to generate footage of the at least one specific vehicle driving along the race track.

* * * * *